United States Patent [19]

Vakhidov et al.

[11] Patent Number: 5,036,735

[45] Date of Patent: Aug. 6, 1991

[54] BAR-CLAMPING DEVICE

[76] Inventors: Khaidar A. Vakhidov, massiv Chilanzer, 2 kvartal, 23, kv. 6; Erkin T. Abdukarimov, Ts-I, 52, kv. 6; Lipilla Ismailov, massiv Junus-Abad. kvartal, 5, 11, kv. 98, all of Tashkent, U.S.S.R.

[21] Appl. No.: 423,417

[22] PCT Filed: Jan. 20, 1988

[86] PCT No.: PCT/SU88/00015

§ 371 Date: Sep. 19, 1989

§ 102(e) Date: Sep. 19, 1989

[87] PCT Pub. No.: WO89/06579

PCT Pub. Date: Jul. 27, 1989

[51] Int. Cl.$^5$ .............................................. B23B 31/20
[52] U.S. Cl. .................................. 82/142; 279/1 DC; 408/240; 409/232
[58] Field of Search ...................... 409/231, 232, 234; 408/239 R, 240; 279/1 DC; 82/142

[56] References Cited

U.S. PATENT DOCUMENTS 3,926,447 12/1975 Cox, Jr. ...................... 279/1 DC X
4,736,957 4/1988 Bischopink .................. 279/1 DC X

FOREIGN PATENT DOCUMENTS 0118676 4/1959 U.S.S.R. .
0474402 9/1975 U.S.S.R. .
1219268 3/1986 U.S.S.R. .

OTHER PUBLICATIONS

Tsangovye zazhimnye mekhanizmy, A. M. Dalsky, 1966.

Primary Examiner—Z. R. Bilinsky
Attorney, Agent, or Firm—Lilling & Lilling

[57] ABSTRACT

Disclosure is made of a bar-clamping device having a hollow spindle carrying first and second collets, each provided with a closing drive ensuring independent axial motion of one of the collets relative to the other. The closing drives of each collet are installed in the spindle and designed so that the axial efforts produced during clamping of a bar are directed in the opposite directions.

1 Claim, 1 Drawing Sheet

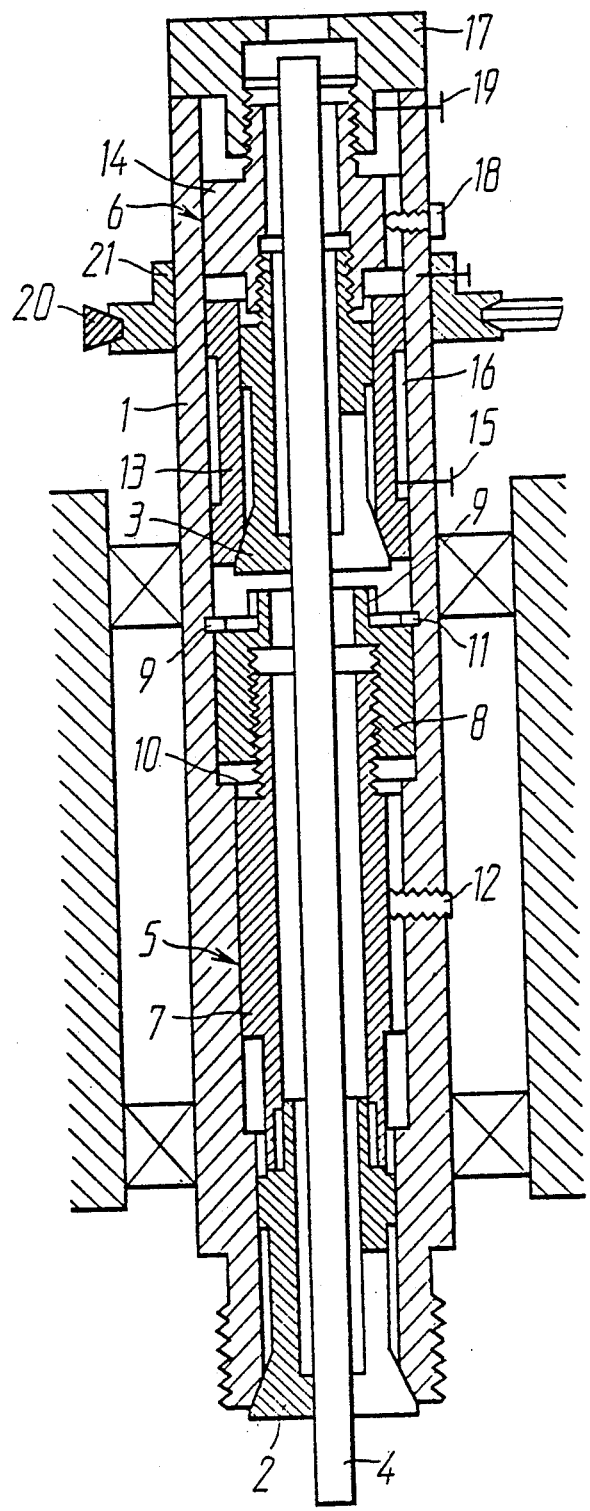

BAR-CLAMPING DEVICE

FIELD OF THE INVENTION

The present invention relates to metal working and, more particularly, to a bar-clamping device.

DESCRIPTION OF THE PRIOR ART

Broaching of deep holes in long bars involves a problem of their accurate positioning and centering in length.

Known in the prior art (SU, A, 1,219,268) is a collet chuck comprising a body which accommodates a collet linked with a rod. Installed inside the chuck is a bushing linked with the rod and provided with flexible tabs whose ends have, both on the inner and outher sides, lugs with tapered surfaces facing the rod. The body and collet extension have grooves meant to accommodate the lugs of the bushing tabs. However, when this desing of the collet chuck is used to clamp the long-measure blank, it becomes necessary to machine the best part of its length with the aid of special devices, i.e. rests, which have no common base with the collet chuck (thus, the collet chuck of the machine tool is installed in the spindle whereas the rest is mounted on the frame) which affects adversely the machining accuracy. It also should be noted that the impossibility of tensioning the long-measure blank of the bar type likewises impairs the accuracy of machining. In addition, this calls for the use of special collets which brings about certain difficulties into the employment of the device as a whole.

Another known bar-clamping device (SU, A, 474402) comprises a spindle accommodating two collets with a single common collet-closing drive. The collets are rigidly coupled to each other.

However, this device fails to clamp the long bar with its simultaneous tensioning between the two collets since the latter are rigidly coupled to each other; as a result, accuracy and surface finish of the hole walls are impaired.

SUMMARY OF THE INVENTION

An object of the present invention resides in providing a design of a bar-clamping device which would allow making deep holes in bars, increase output, and improve the accuracy and surface finish of deep holes in the bars.

This object is achieved by providing a bar-clamping device comprising a hollow spindle accommodating coaxially-arranged first and second collets. According to the invention, each collet has a closing drive of its own ensuring independent axial motion of each collect with relation to the other one. The closing drives of each collet are installed in the spindle and designed so that the axial forces arising during the clamping of the bar are directed oppositely to each other.

It is practicable that the closing drive of the first collet would have the form of a sleeve with a nut installed on one end, said nut being locked against axial motion, the other end of the sleeve would fit around the extension of the first collet and be connected therewith by a screw joint; it is also practicable that the closing drive of the second collet would be made of two bushings. One of these bushings fits around the second collet and is secured rigidly on the internal surface of the spindle. One end of the second bushing would fit around the extension of the second collet and be connected with said extension by a screw join, and the second end of the second bushing should be provided with a nut ensuring axial motion of the second collet relative to the first collet and clamping of the bar with a certain tension.

The provision in the bar-clamping device of the closing drives for each collet and their construction ensure clamping of the bar and application thereto of tensile stresses which permits making deep and extra-deep holes in the bars at a high output, accuracy and surface finish of the hole walls.

Now the hereinproposed invention will be explained by way of example with reference to the appended sectional drawing of the bar-clamping device.

DETAILED DESCRIPTION OF THE INVENTION

The bar-clamping device according to the invention comprises a hollow spindle 1 accommodating two collets 2 and 3 coaxially-installed with a provision for independent motion and intended for clamping the bar 4, the first collet 2 being installed in the spindle 1 at the feed side of the machining tool (not shown in the drawing). The taper of the collet 2 interacts with a tapered recess in the butt end of spindle 1. Each of the collets 2 and 3 is provided with a closing drive 5,6, respectively. The closing drive 5 of the first collet 2 has the form of a sleeve 7 connected at one end by internal thread with the extension of the first collet 2, while the other end of the sleeve 7 is provided with an external thread for the nut 8 which has splines 9 for a special socket wrench and is limited at one side by a shoulder 10 inside the spindle 1 and by a ring 11 at the other. The sleeve 7 is fixed relative to the spindle 1 by a pin 12.

Installed on the other end of the spindle 1 in its internal space opposite to the location of the first collet 2 is the second collet 3 with its closing drive 6. The closing drive 6 has the form of two bushings 13 and 14. One of the bushings 13 is rigidly secured on the internal surface of the spindle 1 by screws 15 equispaced around the circumference of the bushing 13 and fits around the second collet 3. The desing of the bushing 13 is technologically improved by providing it with a recess 16. The external surface of the extension of collet 3 is threaded for screwing on the second bushing 14 and the other end of the bushing 14 is provided with an external thread for screwing on nut 17. A slot in bushing 14 receives a screw 18 which keeps bushing 14 against turning inside the spindle 1. Nut 17 is help against uncontrollable screwing off by locking screw 19. Spindle 1 is set in rotation by a drive (not shown in the drawing) via a belt drive whose belt 20 is installed on pulley 21 located on the external surface of spindle 1.

The bar-clamping device operates as follows. Before installing bar 4 into collet 2, screws 15, 18 and 19 on spindle 1 are turned out so as to ensure free outward travel of bushing 13 with second collet 3 and of bushing 14 with nut out of spindle 1. After withdrawing the above-listed elements from spindle 1, a special socket wrench is inserted into spindle 1; the wrench is, assentially, a pipe with a handle at one end and splines for engaging nut 8 at the other. The outside diameter of the wrench pipe shall not be larger than the diameter of the cavity of spindle 1 into which the wrench should enter freely (not shown in the drawing). The socket wrench has a cavity which must accommodate freely the protruding end of the clamped bar 4. The special socket wrench is put in engagement with splines 9 of nut 8 and rotates the latter to move bushing 7 towards the first collet 2; the first collet 2 moves out and its tabs diverge. As soon as the first collet 2 has moved out over a distance sufficient for free pulling of bar 4 through it, the bar is inserted so that the length of said bar is sufficient for its fastening in the second collet 3. Then nut 8 is turned with the special socket wrench so that bushing 7 screwing into nut 8 would pull the first collet 2 into the cavity of spindle 1 to a position in which bar 4 is reliably clamped by the tabs of the first collet 2. Then the socket wrench is withdrawn from the spindle 1. Bushing 13 complete with the second collet 3, and bushing 14 with nut 17 are inserted into spindle 1 instead of the special socket wrench in such a way that bar 4 enters into the second collet 3. After installing all the elements into spindle 1, as shown in the drawing, bushing 13 is locked with screws 15 while screw 18 is turned into the slot of bushing 14 so that screw 18 does not interfere with the axial motion of bushing 14. Then nut 17 begins to be turned with a wrench (not shown in the drawing) so that bushing 14 being screwed into nut 17 would move the second collet 3 into o bushing 13. Having clamped bar 4, the second collet 3 withdraws from the firts collet 2, thus tensioning bar 4. After bar 4 has been reliably clamped, rotation of nut 17 is discontinued and said nut 17 is locked with screw 19. The drive is turned on and starts rotating spindle 1 together with bar 4 secured therein. Bar 4 is ready for machining.

The machined bar 4 is extracted as follows. As spindle 1 stops, screw 19 is turned out until its end protruding into the cavity sinks completely into the body of spindle 1 and nut 17 is turned a few revolutions so as to move it a certain distance from the butt end of spindle 1. Then nut 17 is struck lightly to move bushing 14 and the second collet 3 coupled thereto towards the first collet 2. As a result, the second collet 3 moves out of bushing 13 and the tabs of the second collet 3 open, freeing the clamped bar 4. Then screws 15 and 18 are turned out until their ends protruding into the cavity sink completely into the body of spindle 1. Then nut 17 is pulled out together with all the elements coupled therewith. Nut 8 is turned with the special socket wrench until the first collet 2 moves out of spindle 1 and releases the clamped bar 4 which is then freely taken out of the spindle.

As compared with the know devices, the herein-proposed device for clamping the bar features a number of advantages, viz., highly accurate alignment of the bar because the points of bar clamping are located sufficiently far from one another which ensures a sufficiently rigid fastening of the bar; in addition, both collets have a single common aligning base in the form of the internal cavity of the spindle. It also shall be noted that the clamping of the bar makes for its stiffness due to its tensioning which rules out probable vibrations and sagging in the middle of the bar section between the clamping tabs of both collets.

It is noteworthy also that the clamped bar lies almost completely within the dimensions of the spindle with but a small part protruding beyond the butt end of the first collet which permits the use of smaller machine tools than in the case of the known solution for clamping and machining long-measure bar-type blanks at a single setting-up. These advantages broaden the tecnological capabilities and give a simultaneous improvement in the precision of the hole made in the bar.

INDUSTRIAL APPLICABILITY

The bar-clamping device for making deep holes in said bar can be used to advantage in metal-working industry and in the field of electric discharge machining.

We claim:
1. A bar-clamping device, comprising:
a hollow spindle;
first and second collets coaxially installed within said spindle and said collets clamping a bar installed within said spindle and said collets;
first and second closing drives for said first and second collets, respectively, and said first and second closing drives providing independent axial movement of one of said collets relative to the other of said collets, said first and second closing drives being installed in said spindle and the axial efforts produced by said first and second closing drives when said collets clamp a bar being directed in opposite directions;
wherein said first closing drive includes a sleeve having one end connected with said first collet, and a nut threaded on a second end of said sleeve;
and wherein said second closing drive includes first and second bushings, said first bushing of said second closing drive being rigidly secured on an internal surface of said spindle and fitting around said second collet, said second bushing of second closing drive being threaded onto a first end of said bushing, and a nut threaded onto a second end of said bushing and permitting axial movement of said second collet relative to the first collet and clamping of said bar with a certain tension.

* * * * *

UNITED STATES PATENT AND TRADEMARK OFFICE
CERTIFICATE OF CORRECTION

PATENT NO. : 5,036,735

DATED : August 6, 1991

INVENTOR(S) : Khaidar A. Vakhidov

It is certified that error appears in the above-identified patent and that said Letters Patent is hereby corrected as shown below:

Col. 4, line 40, line 17 of claim 1, after "said sleeve", insert --said nut being fixed relative to said spindle--;

Col. 4, line 45, line 22, of claim 1, after "bushing of" insert --said--; and

Col. 4, line 47, line 24 of claim 1, change "bushing" to --second collet--.

Signed and Sealed this

Fifth Day of January, 1993

Attest:

DOUGLAS B. COMER

*Attesting Officer*      *Acting Commissioner of Patents and Trademarks*